Oct. 31, 1944.   J. O. BAKER   2,361,447
SENSITOMETRY
Filed Feb. 21, 1941
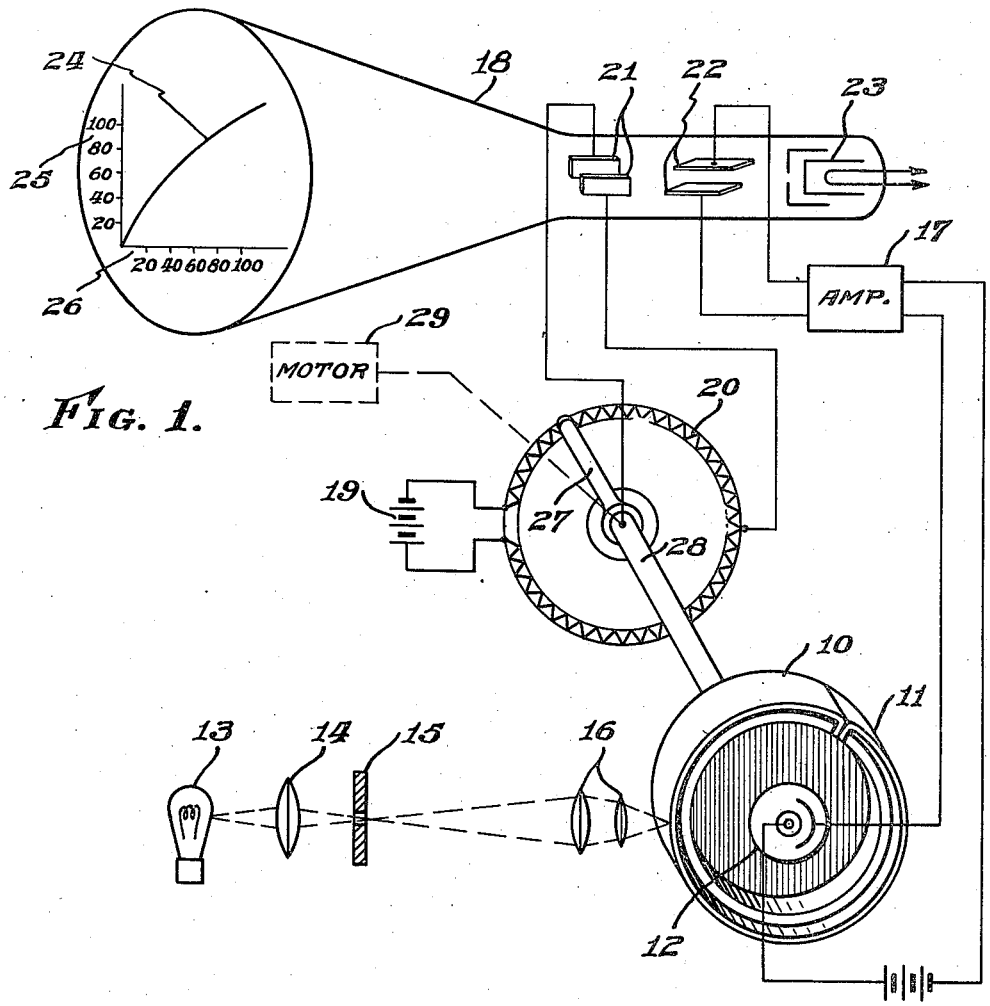
Fig. 1.
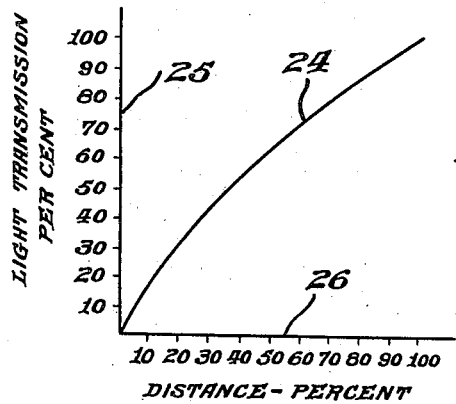
Fig. 2.
Inventor
Judd O. Baker
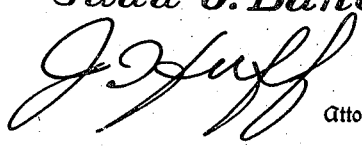
By
Attorney Patented Oct. 31, 1944

2,361,447

UNITED STATES PATENT OFFICE 2,361,447

SENSITOMETRY

Judd O. Baker, Medford Lakes, N. J., assignor to Radio Corporation of America, a corporation of Delaware Application February 21, 1941, Serial No. 379,982

2 Claims. (Cl. 88—14)

This invention relates to an apparatus for the sensitometry of photographic emulsions. Although the apparatus is a variety of densitometer, it differs from the customary densitometers in that it does not measure the density of a specific area or the average density of an extended area, but instead plots a curve preferably corresponding to the H and D curve and showing the gradation of density or transmission over a predetermined distance in the exposed film. In addition, the apparatus applies the curve of density to the fluorescent screen of a cathode ray tube in such a manner that the film speed may be read directly on the face of the tube or the curve may be photographed.

In the performance of the invention, a predetermined length of the film of which the speed is to be ascertained is given an exposure which varies in a predetermined manner from one end of the strip to the other. This exposure may vary either linearly or logarithmically, but it is necessary that the exposure variation be according to a predetermined curve or formula so that a uniform progression of exposure from one end to the other of the predetermined length is secured. Such exposure may be accomplished by the sensitometer described and claimed in my application Serial No. 372,815, filed January 2, 1941, particularly the form of sensitometer shown in Figs. 7, 8 and 9 of the said application. The exposure of the film, of course, may be accomplished in any other desired manner, as, for example, the exposure thereof through a variable density strip of appropriate dimensions and densities. After the test strip is developed, it is scanned photoelectrically from one end to the other and the potential produced by the scanning is applied to a cathode ray tube so as to deflect the cathode ray beam in one sense according to the light transmitted by the film, while the beam is simultaneously being deflected in the perpendicular sense in accordance with the position of the scanning light on the test strip. This causes the spot of light on the screen of the cathode ray tube to plot a curve of light transmission against the length of the test strip and, if the exposure of the film follows a logarithmic law, then this curve plotted will accurately correspond with the H and D curve which is usually plotted manually from a series or readings of different individual exposures.

It will be apparent that a single scanning of the test strip will produce a single passage of the spot of light on the screen of the cathode ray tube and this is sufficient for a photographic recording of the characteristic curve. However, it is not usually necessary to make a photographic record of the characteristic curve particularly as between different batches of the same type of emulsion and a visual inspection of the curve is sufficient to determine the speed of the particular emulsion. An apparatus is therefore provided which repeats the scanning operation at sufficiently short intervals so as to maintain the curve apparently continuously luminous so that it may be inspected.

One object of the invention is to provide an improved apparatus for determining the sensitometric curve of photographic emulsions.

Another object of the invention is to provide a densitometer which will plot a density curve rather than merely measuring local or average densities.

Another object of the invention is to provide an improved type of scanning densitometer.

Another object of the invention is to provide a sensitometric device which will directly produce a sensitometric curve.

Other and incidental objects of the invention will be apparent to those skilled in the art from a reading of the following specification and an inspection of the accompanying drawing in which Figure 1 is a schematic diagram showing the preferred form of the invention, and Figure 2 is an elevation of a type of sensitometric curve such as would be produced on the fluorescent screen of the cathode ray tube shown in Fig. 1.

In the apparatus shown in Fig. 1, the exposed and developed film sample is indicated at 10. This sample or test strip is secured to the drum 11 in such a manner that one edge thereof overhangs the end of the drum. The film may be secured to the drum in any appropriate manner; in the drawing it is shown as merely having its two ends inserted into a slot in the drum, but, if desired, this fastening may be supplemented in any customary manner, as, for example, by further holding the film onto the drum by means of an elastic band of metal or rubber and securing it by a pair of semicircular clamping members or even securing it by adhesive. The only important requirement in the manner of securing the film to the drum is that the film should not vary materially in its position in regard to the focal plane of the optical system during its passage therethrough. Light from an exciter lamp 13 is focused by an appropriate condenser lens 14 upon an aperture plate 15 and the image of the aperture is then focused upon the film by the objective 16 in the manner customary in the reproducton of sound from photographic sound records in order to secure substantially a point or linear scanning spot. This arrangement is prefererd for the reasons that it is not only highly satisfactory but readily available commercially, but any equivalent apparatus may be substituted for causing light to pass through a small area of the film, many such devices being shown in the patented art. The light which passes through the film strikes the photocell 12. The current through the photocell 12 which varies in accordance with the amount of light striking it is applied to the amplifier 17, which is preferably a D. C. type of voltage amplifier, and the output of this amplifier is applied to the deflecting plates 22 of the cathode ray tube 18. This cathode ray tube is preferably of the type commercially known as an Iconoscope and is provided with an electron gun 23 which directs a rather sharply focused beam of cathode rays through the pairs of deflecting plates 21 and 22 to the fluorescent screen of the large end of the tube.

On the same shaft with the drum 11 there is located a movable contact 27 which is adapted to move over the potentiometer resistor 20. Appropriate potential is applied across the resistor 20 by a source of current 19 and the potential derived between the midpoint of the resistor 20 and the movable contactor 27 is applied to the pair of deflector plates 21 of the Iconoscope. The plates 21 produce deflection of the cathode ray beam perpendicular to the deflection produced by the plates 22 controlled from the photocell circuit. The blank space between the two ends of the potentiometer resistor 20 is so located in relation to the contact 27 that the contact arm 27 will be on this space at the same time that the two ends of the film strip 10 are passing through the scanning beam and any effect of the ends of the film strip on the scanning beam is therefore thrown off the curve being traced by the apparatus and, although visible on the screen of the tube, will not interfere with the visibility or legibility of the curve being traced.

In the operation of the device, after the film sample is installed in the drum 11, the shaft 28 is caused to rotate by an appropriate driving means 29 so that the drum 11, the film strip 10, and the contactor 27 rotate together. This rotation should preferably be at a speed such that the persistence of vision plus the persistence of the image on the screen of the cathode ray tube will cause the curve traced on the fluorescent screen to appear as a continuous line 24. An appropriate speed of revolution is something of the order of 1,000 R. P. M., or slightly upwards of 16 revolutions per second. Any higher speed of rotation may, of course, be used, if desired, but, at too high a speed of rotation, the wear upon the potentiometer might become excessive, or centrifugal force might tend to throw the film sample 10 outwardly and thereby produce erratic readings.

It will be apparent that the deflecting plates 22 will cause the spot of light on the end of the cathode ray tube to be deflected vertically in accordance with the light transmission through the film sample, while, at the same time, the deflecting plates 21 cause the deflection thereof laterally in accordance with the portion of the film sample being scanned at the corresponding instant. If the film sample varied perfectly uniformly in light transmission, the resulting plot would, of course, be a straight line, but practically, due to the variation in density with exposure in accordance with the well-known H and D curve, the curve traced will depart from a straight line. In the particular arrangement shown, the curve 24 corresponds more or less with the curve which might be produced by what is referred to in sound recording work as the overall transmission. A sensitometric exposure is made on the negative film as described above, and, after development, this is printed onto a piece of positive film stock which is then developed and tested in the apparatus. In this case, the curve produced should be as nearly a straight line as possible in order to secure optimum sound reproduction.

If it is desired to measure emulsion speed directly, the emulsion may be given an exposure which is varied logarithmically and then developed and scanned in the apparatus. The curve produced under such circumstances will be the H and D curve for that particular emulsion.

It will be apparent to those skilled in the art that my invention is not limited to the specific means shown, but that the mechanism for performing the invention shown is the preferred form in view of the fact that it can be constructed from commercially available parts and can be easily calibrated. The apparatus may, if desired, be quite considerably modified within the scope of the invention. For example, the photocell and exciter lamp might be interchanged without any modification of the operation of the apparatus or the optical system might be rotated while the film remains stationary. The film might be used flat and scanned by an appropriate optical system, such as one of the various scanning devices known in the art. Instead of the film being itself scanned, an image thereof may be produced which, in turn, would be scanned, as, for example, by the use of a kinescope instead of the mechanical scanning device shown. Likewise, an electrical sweep circuit control device might be substituted for the potentiometer 20, 27, such sweep circuits being well known in the oscillograph art. If, as just indicated, a kinescope were used for scanning the image of the test strip and a sweep circuit oscillator were substituted for the potentiometer, these two circuits could be interlocked in the manner customary in television scanning circuits and known in that art instead of using a mechanical connection between the scanning and sweep circuit devices. Likewise, av equivalent electrically controlled curve plotting device might be substituted for the cathode ray tube illustrated. For example, a paper might be moved mechanically by the shaft 28 as, for example, on a drum or past a fixed position, by an appropriate setting mechanism, so that the paper bore a predetermined relation to the position of the test strip 10, while an appropriate curve drawing mechanism, such as a galvanometer controlled pen actuated by the photocell 12, plotted the curve in the direction transverse to the direction of movement of the paper.

I claim as my invention:

1. Sensitometric apparatus comprising a drum shaped rotatably mounted carrier for a sensitometric strip, means for rotating said carrier about its axis, means for mounting said strip on said carrier with an edge portion thereof overhanging the edge of said drum, a light source on one side of said strip, a photocell on the opposite side of said strip, said carrier rotating means including a shaft attached at one end to the base of said carrier drum and having at its other end a contact arm, an annular resistor over which said contact arm is movable, a source of electrical current connected to the ends of said resistor, and a cathode ray tube having two pairs of plates, one pair of plates being connected to said photocell and the other pair of plates being connected to said resistor and contact arm.

2. Sensitometric apparatus in accordance with claim 1 in which means are provided for driving said carrier rotating means at a rate within the period of persistence of vision.

JUDD O. BAKER.